US012764256B2

(12) United States Patent
Zatvornytskyi et al.

(10) Patent No.: US 12,764,256 B2
(45) Date of Patent: Oct. 13, 2026

(54) VIDEO SURVEILLANCE SYSTEM

(71) Applicant: MILESTONE SYSTEMS A/S, Brøndby (DK)

(72) Inventors: Oleksii Zatvornytskyi, Brøndby (DK); Peter Posselt Vergmann, Brøndby (DK)

(73) Assignee: MILESTONE SYSTEMS A/S, Brøndby (DK)

(*) Notice: Subject to any disclaimer, the term of this patent is extended or adjusted under 35 U.S.C. 154(b) by 0 days.

(21) Appl. No.: 18/434,025

(22) Filed: Feb. 6, 2024

(65) Prior Publication Data

US 2024/0267491 A1 Aug. 8, 2024

(30) Foreign Application Priority Data

Feb. 7, 2023 (GB) ...................................... 2301679

(51) Int. Cl.

| | |
|---|---|
| ***H04N 7/18*** | (2006.01) |
| ***G06F 16/735*** | (2019.01) |
| ***G06F 16/738*** | (2019.01) |
| ***G06V 10/94*** | (2022.01) |
| ***G06V 20/40*** | (2022.01) |
| ***G06V 20/52*** | (2022.01) |

(52) U.S. Cl.

CPC ........... *H04N 7/181* (2013.01); *G06F 16/735* (2019.01); *G06F 16/738* (2019.01); *G06V 10/945* (2022.01); *G06V 20/40* (2022.01); *G06V 20/52* (2022.01); *G06V 2201/10* (2022.01)

(58) Field of Classification Search

CPC ..... H04N 7/181; G06F 16/735; G06F 16/738; G06F 16/787; G06V 10/945; G06V 20/40; G06V 20/52; G06V 2201/10; G06V 20/44

USPC ........................... 348/159; 386/227; 715/719

See application file for complete search history.

(56) References Cited

U.S. PATENT DOCUMENTS

| | | | | |
|---|---|---|---|---|
| 2013/0091432 | A1* | 4/2013 | Shet | G06F 16/73 715/719 |
| 2013/0129307 | A1* | 5/2013 | Choe | G06F 3/048 386/227 |
| 2015/0085114 | A1* | 3/2015 | Ptitsyn | H04N 7/183 348/143 |
| 2018/0253603 | A1* | 9/2018 | Yamamoto | G06V 20/52 |
| 2018/0322197 | A1* | 11/2018 | Hesterman | B61L 15/0027 |
| 2020/0327347 | A1* | 10/2020 | Arai | H04N 7/181 |
| 2021/0256268 | A1* | 8/2021 | Miyake | H04N 7/181 |
| 2021/0270606 | A1* | 9/2021 | Barton | G01C 11/02 |
| 2021/0279926 | A1* | 9/2021 | Waniguchi | G06T 11/26 |

FOREIGN PATENT DOCUMENTS

WO 2016/042946 A1 3/2016

* cited by examiner

*Primary Examiner* — Hung Q Dang
*Assistant Examiner* — Stephen R Smith
(74) *Attorney, Agent, or Firm* — Canon U.S.A Inc. IP Division

(57) ABSTRACT

The present disclosure generally relates to video surveillance systems and optionally computer-implemented video management methods for video surveillance systems. A video management system may be configured to display search results of a plurality of video streams as respective thumbnails on a geo-map at respective positions of the search results within a surveillance area.

16 Claims, 3 Drawing Sheets

VIDEO SURVEILLANCE SYSTEM

CROSS REFERENCE

This application claims the benefit under 35 U.S.C 119 (a)-(d) of the United Kingdom Patent Application No. 2301679.3, filed on Feb. 7, 2023, and titled "VIDEO SURVEILLANCE SYSTEM"; this cited patent application is incorporated herein by reference in its entirety.

TECHNICAL FIELD

The present disclosure generally relates to video surveillance systems and optionally computer-implemented video management methods for video surveillance systems. A video management system may be configured to display search results of a plurality of video streams as respective thumbnails on a geo-map at respective positions of the search results within a surveillance area.

BACKGROUND

Modern video surveillance systems have evolved into highly complex and often heterogeneous systems comprising a large number of different peripheral devices and computer hardware elements that are tied together via a networked infrastructure, and controlled by means of advanced management software. One important component of modern video surveillance systems is a video recording and processing system that allows video streams from one or more video cameras to be received, stored and processed.

A video management system (VMS), also known as video management software or a video management server, is a component or sub-system of a video surveillance system. The VMS typically provides various video management services, such as one or more of the following: collecting one or more video streams from one or more video cameras, storing the received one or more video streams to a storage device and providing an interface to view the received one or more live video streams and/or to access one or more stored video streams.

Moreover, it is generally desirable that surveillance systems and, in particular, VMSs are versatile and can be used in different types of applications which may impose different demands or requirements to processing and displaying received video streams supplied by the one or more video cameras. Moreover, the demands and requirements imposed in a surveillance system may change over time.

A particular challenge to video surveillance systems and the VMS subsystem is to handle video streams supplied by moving or movable, i.e. non-stationary, video cameras during normal operation of video surveillance system. The movable video camera or cameras may move or travel through a geographical surveillance area and/or facilities like office buildings etc.

SUMMARY

It is an object of the present disclosure to solve one or more of the challenges identified above and/or other circumstances associated with existing video surveillance systems, or at least to provide an alternative to known systems.

A first aspect of the present disclosure relates to a video surveillance system comprising:

a plurality of video cameras arranged in a surveillance area and configured to generate respective video streams. The plurality of video cameras comprises respective position detecting devices, or are associated with respective position detecting devices, configured to supply respective metadata streams associated with the plurality of video streams. The video surveillance system comprises a video management system (VMS) which comprises:

a geo-map of the surveillance area, a user screen or display comprising a graphical user interface configured a processing unit configured to receive the plurality of video streams and the respective metadata streams via a data communication interface, wherein said processing unit is further configured to:

search the plurality of video streams and respective metadata streams in accordance with one or more search criteria to identify at least one of a target object, a target activity and a target incident in the surveillance area, display search results of the plurality of video streams by respective thumbnails on the user screen via the graphical user interface, wherein each thumbnail comprises a frame of a video stream corresponding to a position of a search result, characterized in that:

displaying the thumbnails on a geo-map at respective positions of the search results.

The thumbnails on the geo-map may be displayed adjacent to the respective positions of the search results for example by an arrow or similar pointer indicating a structure at the geo-map position in question such as a specific position or location on a road, street or highway, a factory or office building, a train or bus stations, a traffic junction etc.

The metadata stream associated with each video stream preferably includes time stamps together with corresponding position data associated with the video camera in question. This embodiment allows time synchronization of the video streams and metadata streams received at the VMS.

The plurality of video cameras may comprise at least one movable video camera and optionally one or more stationary video cameras according to one embodiment of the video surveillance system. The at least one movable video camera may travel along a path or trail of the surveillance area via mounting to any suitable support structure of a vehicle for example motorized vehicles like cars, trucks, busses, trains, motorcycles etc. The at least one movable video camera may be moved or transported along the path or trail of the surveillance area by way of mounting on, or worn by, a person via a suitable support like a belt etc. The one or more stationary video cameras may be mounted on, or fixed to, various kinds of stationary structures like factory or office buildings, train stations, or support structures, arranged at traffic roads or junctions etc.

The processing unit may further be configured to determine at least one camera trail associated with detected positions of the at least one movable video camera and preferably to display the at least one camera trail by a plurality of position markers, such as dots, crosses, dotted lines, on the geo-map as discussed in further detail below with reference to the appended drawings.

The processing unit may be configured to utilize search criteria or criterion defined by a VMS operator, e.g. user of the VMS, for the search of the plurality of video streams and associated metadata streams. The user may for example specify a certain time span and a certain geographical area of the surveillance area for identification of the at least one of a target object, a target activity and a target incident as search criteria.

In accordance with some embodiments of the system, the processing unit may be configured to:

store the plurality of video streams and respective metadata streams in a video data repository and in a metadata repository, respectively;

retrieve the plurality of video streams and respective metadata streams from the video data repository and metadata repository, respectively, as discussed in further detail below with reference to the appended drawings.

The processing unit may be configured to:

associate the respective thumbnails of the search results by corresponding video sequences of the plurality of video streams, display a plurality of user clickable or activatable buttons corresponding to the video sequences via the graphical user interface. The user can thereby obtain a fast overview of the respective positions of the search results on the geo-map. When the user has examined the search results based on that information the video sequences of interest or relevance can be replayed by a simple click operation on the user clickable or activatable button in question. In some embodiments the user clickable or activatable button may be the thumbnail or simplify the graphical user interface layout.

According to yet another embodiment of the video surveillance system, the processing unit is configured to:

apply at least one supplementary search criterion, automatically or under user control, to the search results of the plurality of video streams to identify a subset of search results matching the least one supplementary search criterion, add visually distinguishing attributes to the respective thumbnails of the geo-map representing the subset of search results matching the least one supplementary search criterion.

This embodiment of the VMS is capable of refining initial search results, either automatically or under user control, by applying the least one supplementary search criterion. The subset of search results reduces the number of remaining search results while the addition of the visually distinguishing attributes to the respective thumbnails on the geo-map representing the subset of search results provides the user with an intuitive and fast way of identifying the relevant search results on the geo-map for further exploration and analysis as needed. The number of remaining search results are reduced in the sense that the thumbnail(s) which comprises the supplementary search criterion are highlighted, i.e. visually distinguished, from the thumbnail(s) from the search results which do not comprise the supplementary search criterion, i.e. the initial search using the one or more search criteria to identify at least one or a target object, a target activity and a target incident in the surveillance area. That is to say that the number of displayed thumbnails is not reduced.

The VMS operator is provided with an intuitive and fast way of identifying the subset of search results matching the supplementary search criterion (the most relevant search results) in the context of the results of the initial search. The most relevant search results being provided with a visually distinguishable element added to the relevant thumbnails while the remaining thumbnails do not get highlighted to indicate less relevance. This allows the VMS operator to easily focus on what may be the most relevant search results.

Furthermore, by displaying all thumbnails with a subset being highlighted ensures that the VMS operator is provided with as much information as possible and also verify that possible positive search results have not been missed.

A VMS operator may not necessarily need to redo a complete search but can simply change the supplementary search criterion to produce a new subset from the initial search results.

A VMS operator may select a thumbnail from the initial search results. The VMS may automatically determine search criteria based on the selected thumbnail. That is to say, that the VMS may automatically determine one or more search criteria based on the video frame or video sequence represented by the selected thumbnail. The automatic determination of search criteria provides the VMS operator with a way to more easily refine their initial search either by generating a subgroup of highlighted thumbnails or by redoing the initial search with criteria relevant to the selection.

The automatically determined search criteria may be used for the supplementary search criterion. The automatically determined search criterion may be used to redo the initial search.

The skilled person will understand that numerous types of visually distinguishing attributes may be associated with or added to the thumbnails for example icons, coloured borders, coloured objects, textual tags, etc.

A second aspect of the present disclosure relates to a computer-implemented video management method for a video surveillance system, comprising steps:

a) receive, at a video management system, a plurality of video streams and respective metadata streams supplied by, or associated with, respective ones of a plurality of video cameras, b) retrieve a geo-map of a surveillance area of the video surveillance system, c) search the plurality of video streams and respective metadata streams in accordance with one or more search criteria, d) identify at least one of a target object, a target activity and a target incident in the surveillance area in response to the search, e) display search results of the plurality of video streams by respective thumbnails via a graphical user interface on a user screen, wherein each thumbnail comprises a frame of a video stream corresponding to a search result, f) indicate positions of the search results by the respective thumbnails on the geo-map.

The computer-implemented video management method may further comprise steps of:

h) determine at least one camera trail associated with detected positions of at least one movable video camera, i) display the at least one camera trail by a plurality of position markers on the geo-map.

The computer-implemented video management method may further comprise steps of:

j) store the plurality of video streams and respective metadata streams in a video data repository and in a metadata repository, respectively;

k) retrieve the plurality of video streams and respective metadata streams from the video data repository and metadata repository, respectively, apply step c) to the retrieved plurality of video streams and respective metadata streams. The storage and retrieval of the plurality of video streams and respective metadata streams allow the user to carry out off-line, as opposed to real-time or live video streaming, investigations and searches for example using the one or more search criteria.

The computer-implemented video management method may further comprise steps of:

l) associate the search results of the plurality of video streams and respective metadata streams with respective video sequences, m) associate the respective thumbnails of the search results by corresponding video sequences of the plurality of video streams, n) display a plurality of user clickable or activatable buttons corresponding to the video sequences via the graphical user interface.

A third aspect of the present disclosure relates to a video management system (VMS) comprising a processing unit comprising a plurality microprocessor executable program instructions configured to carry out at least the steps of a)-f) discussed above. Optionally, a plurality of additional microprocessor executable program instructions may configured to carry out any of steps h)-i) or steps j)-k) or steps l)-n).

The position of each search result, i.e. the position of the thumbnail on the geo-map, may be determined based on a position of the video camera associated with the respective video stream corresponding to the search result. Put another way the VMS uses the position of the video camera which provided the video stream comprising a search hit, i.e. positive search result, to determine the position of the search result on the geo-map.

The thumbnail may be positioned based on the determined position. For example, it may be position proximate the determined position of the search result. If the thumbnail is spaced away from the determined position, an arrow or other indicator may be used to point from the thumbnail to the determined position.

The position of the video camera may be unchanging or dynamic. Typically, static or stationary cameras have an unchanging position, the location or coordinates of these cameras will be known, i.e. predetermined, to the VMS, for example they may be set during installation of the cameras by using a positioning device. Static or stationary cameras may also provide metadata which comprises positioning or location data. Typically, movable cameras will have a dynamic position and as such a GPS device will provide metadata which comprises positioning or location data.

The position of each search result may also be determined based on further data or information. For example, the position of each search results may be further based on at least one of GIS data and FOV data associated with the video camera associated with the respective video stream corresponding to the search results.

A fourth aspect of the present disclosure relates to a video management system comprising:

a user screen or display comprising a graphical user interface configured to present the plurality of video streams and a geo-map of a surveillance area; and a processing unit configured to:

a) receive a plurality of video streams from a plurality of video cameras in the surveillance area via a data communication interface, b) receive metadata streams via the data interface, the metadata streams being from position detecting devices associated with the plurality of video cameras via a data, c) search the plurality of video streams and respective metadata streams in accordance with one or more search criteria to identify at least one of a target object, a target activity and a target incident in the surveillance area, d) display search results of the plurality of video streams by respective thumbnails on the user screen or display via the graphical user interface, wherein each thumbnail comprises a frame of a video stream corresponding to a position of a search result, wherein the thumbnails are displayed on a geo-map at respective positions of the search results, e) determine a selection of one or more of the search results through a user interaction, f) determine at least one supplementary search criterion based on the one or more selected search results, g) search the plurality of video streams and respective metadata streams in accordance with the at least one determined supplementary search criterion, and h) update the user screen or display based on the search results from g).

A computer-implemented video management method and/or a video surveillance system may comprise the features of the fourth aspects of the present disclosure.

One or more features or elements of any aspect of the present disclosure may combined individually with any one or more features or elements of any other aspects of the present disclosure provided there is a beneficial advantage.

BRIEF DESCRIPTION OF THE DRAWINGS

The above and other aspects will be apparent and elucidated from the embodiments described in the following with reference to the drawings in which.

DETAILED DESCRIPTION

Figure 1:
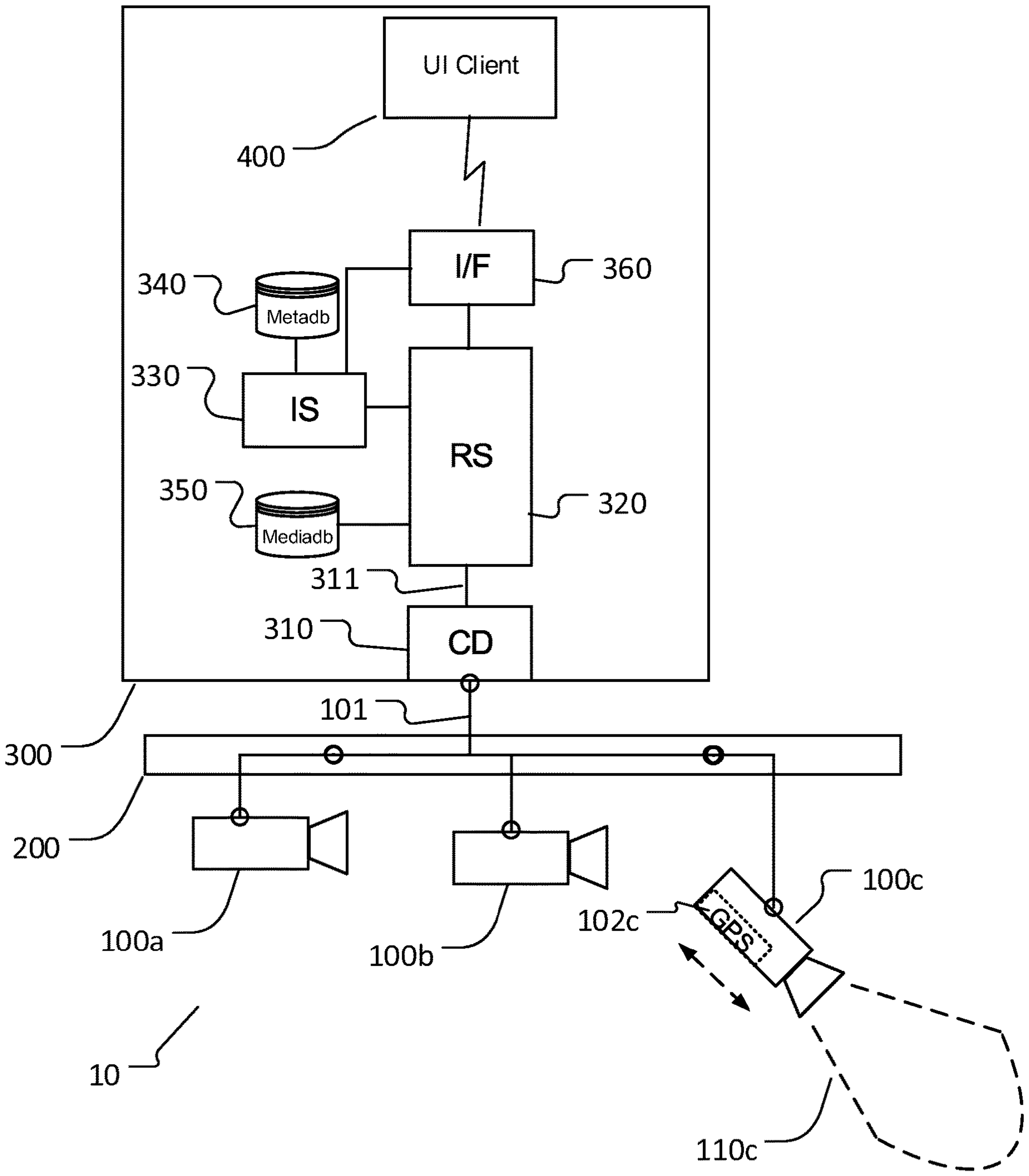
FIG. 1 is a schematic block diagram of an exemplary video surveillance system 10 in accordance with the present disclosure.

FIG. 1 is a schematic block diagram of an exemplary video surveillance system 10. The video surveillance system 10 comprises a plurality of video cameras 100*a*, 100*b*, 100*c* communicatively connected to a video management system (VMS) 300 via respective wired or wireless communication links or connections 200.

Some embodiments of the video surveillance system 10 may comprise a mix of movable video cameras and stationary video cameras, for example at least one movable video camera 100*c* and one or more stationary video cameras 100*a*, 100*b*. Other embodiments may exclusively comprise one or more movable video camera(s) and no stationary video cameras while yet other embodiments exclusively comprise stationary video cameras. The stationary video cameras 100*a*, 100*b* are, when present, typically distributed across a predetermined area or space where surveillance is desired. The number and position/location of the stationary video cameras 100*a*, 100*b* of the video surveillance system 10 as well as the type of video camera comprised therein may be selected based on factors such as a level of surveillance desired, a size of the surveillance area or facility and/or the complexity of the layout of the surveillance area or facility. Each of the stationary video cameras 100_a_, 100_b_ may provide surveillance in a particular zone, or subsection, of the surveillance area. The movable video camera (s) 100_c_ has a Field of view (FOV) and the stationary video cameras 100_a_, 100_b_ have respective FOVs (not shown). The FOV is the open, observable area of the camera in question as schematically illustrated by a pie-shaped outline 110_c_. The skilled person will appreciate that different types of video cameras may have different FOVs for example caused by different optical properties of camera lenses.

In the present specification, the term "movable" as a property of a video camera means the camera can be moved, i.e. is geographically dynamic, while carrying out video recording and/or live video streaming. The video recording and/or live video streaming is often carried out during active operation of the video surveillance system 10. The movable video camera is for example displaced along a certain path or trail of the surveillance area. A stationary video camera is typically fixed to a stationary object, like a building wall or a pole in the surveillance area.

The movable video camera 100_c_ may travel along a path or trail of the surveillance area via mounting to any suitable support structure of various types of vehicles for example motorized vehicles like cars, trucks, busses, trains, motorcycles, drones etc. The movable video camera 100_c_ may be moved along the path or trail of the surveillance area by being mounted on, or worn by, a person via a suitable support like a belt etc. The person may for example be a police officer, bus driver, fireman etc. In the latter situation the movable video camera 100_c_ travels through the surveillance area when the person walks or runs. Alternatively, the movable video camera 100_c_ may be transported or moved via the vehicle's travel when the person wearing the movable video camera 100_c_ is a driver or passenger of the vehicle. The stationary video cameras 100_a_, 100_b_ may be mounted on, or fixed to, various kinds of stationary structures like factory or office buildings, train stations, support structures arranged at traffic roads or junctions etc.

The movable video camera(s) may be conventional portable video camera(s) known as such in the art of video surveillance. It will be appreciated that the video surveillance system 10 typically includes a plurality of movable video cameras of the same type and/or different types. Different types of movable video cameras of the video surveillance system 10 may for example be tailored to specific operation schemes and placements, e.g. fixed to a truck or on-person fixations. The movable video cameras of different types may be configured to supply video streams of different resolution, in different formats or outputting additional metadata associated with the video stream. Examples of functions of the movable video cameras may include one or more of the following: video streaming, in particular live streaming, and/or video recording and audio streaming and/or audio recording. The video streaming and/or video recording may be carried out in visible wavelength ranges and/or in infrared wavelength ranges, such as near-infrared wavelength ranges. The moveable video camera(s) and stationary video cameras may comprise various control functions such as pan or zoom, image processing capabilities, motion detection, etc.

The respective video streams supplied by the stationary video cameras 100_a_, 100_b_ as well as those of the one or more movable video cameras 100_c_ are associated respective metadata streams. The metadata stream may be a separate stream from the associated video stream but originating from either the same video camera or another device mounted on the same person or vehicle as the video camera. The metadata stream associated with each video stream preferably includes time stamps together with corresponding position data associated with the video camera in question. This property allows time synchronization of the video streams and metadata streams at the VMS. The respective geolocations of the stationary video cameras 100_a_, 100_b_ and those of the one or more movable video cameras 100_c_ may be derived from the position data supplied by a camera associated GPS unit or device. The associated GPS unit or device of a movable or stationary video camera may be built into the video camera as schematically illustrated by GPS device 102_c_ of the movable video camera 100_c_, or may be fixed to a vehicle or person carrying the movable video camera in question.

The stationary video cameras 100_a_, 100_b_ as well as the one or more movable video cameras 100_c_ are often communicatively connected to the video management system (VMS) 300 as mentioned above for example connected via a local area network 200 or in any other suitable manner, e.g. via point-to-point wired and/or wireless connections, or the like. For example, the stationary video cameras 100_a_, 100_b_ may be connected to the VMS via an Ethernet connection. The one or more movable video cameras 100_c_ may often be wirelessly connected to the VMS 300, for example, through a wireless network like Wi-Fi, a 4G and/or 5G network. However, one or more movable video cameras 100_c_ may alternatively be configured to record the video stream during active operation where the video camera moves in or through the surveillance area. In the latter scenario, the recorded video stream may be transferred to, or off-loaded at, a media repository 350 of the VMS 300 at the time of return to an associated station. In the latter use case, the video stream may be offloaded at regular time intervals for example when a camera user or cameral vehicle such as a bus driver or police officer returns to the station.

The skilled person will understand that some exemplary video surveillance systems may include additional sensors providing sensor signals and/or media streams different from video streams, such as audio signals, radar signals, Lidar signals, etc.

The VMS 300 is preferably configured to store the received video streams in the media repository 350. The VMS 300 provides an interface 360 for accessing live video streams as well as the previously discussed added metadata, and to access video streams with respective metadata stored in the media repository 350. The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems. The VMS may be configured to implement various types of processing of received live video streams and/or recorded and retrieved video streams for example object detection, object recognition, motion detection etc.

The media repository 350 may comprise a media database or other suitable storage device for storing media content. The VMS 300 may include a user interface client (UI client) 400, for example configured to provide a graphical user interface 500, displayed on a suitable user screen or screens of the VMS 300. The graphical user interface 500 enables users to view live video streams and/or stored and retrieved video streams and/or to control operation of one or more of the stationary video cameras 100_a_, 100_b_ and/or control operation of the one or more movable video cameras 100_c_. The content and structure of data items displayed through the user interface may be configurable by the operator via control buttons etc. The user interface comprises a map component integrated in the VMS. The map component is utilized to build or provide a geo-map of at least a part of the surveillance area, for example a zone, subsection of the surveillance area, for presentation on the user screen via the graphical user interface 500. The map component may be configured to present a geo-map overview of the respective positions of the plurality of video cameras.

The VMS 300 may be embodied as one or more software program(s) comprising respective computer executable instructions configured for execution on a suitable data processing system, e.g. by one or more server computers. The data processing system implementing the VMS is typically arranged remote from the one or more movable video cameras 100*c* as the latter often travel over a large geographical area for example through a route or trail comprising various streets, roads and facilities. The route or trail may cover a city neighbourhood or even an entire city. The video streams from the movable video camera(s) may be transmitted to the VMS 300 over wireless public or other wireless communications networks. Alternatively, the movable video camera(s) 100*c* of the video surveillance system 10 may move in relative proximity to a locally arranged on-site VMS 300 for example in a manufacturing facility, residential or office buildings, shopping centre etc.

The VMS 300 may comprise one or more camera drivers 310 for providing interfaces to respective types of stationary and movable video cameras. Different types of these video cameras may provide their respective video streams in different formats, e.g. using different encoding schemes and/or different network protocols. Similarly, different cameras may provide different interfaces for camera control such as zoom or pan. Accordingly, the VMS 300 may include a plurality of different camera drivers 310 configured to cooperate with respective camera types. In particular, the camera drivers 310 may implement one or more suitable network protocols and/or other communications standards for transmitting data between movable and stationary video cameras and/or other peripheral devices and data processing systems. Examples of such protocols and standards include the Open Network Video Interface Forum (ONVIF) standard and the Real Time Streaming Protocol (RTSP).

The camera drivers 310 may be further configured to add one time stamp to each frame of the received video streams 101 so as to ensure that the video streams, which are stored and subsequently supplied by the VMS 300, include a uniform time stamp. The added time stamp will also be referred to as a canonical time stamp. The canonical time stamp is indicative of the time of receipt, by the VMS 300, of the respective video streams from the respective stationary and movable video cameras. The camera drivers thus provide uniformly time-stamped input video streams 311, each time-stamped input video stream 311 corresponding to a respective one of the received video streams.

The VMS 300 comprises a recording server 320. The recording server may be embodied as a software program module executed by a suitable data processing system, e.g. by one or more server computers. The recording server receives the inputted video streams 311 originating from the respective stationary and movable video cameras through the corresponding camera drivers 310. The recording server stores the received inputted video streams in a suitable media storage device, such as a suitable media database. It will be appreciated that the media repository 350 may be part of the VMS 300 or it may be separate from, but communicatively coupled to the VMS. The media repository 350 may be implemented as any suitable mass storage device, such as one or more hard disks or the like. The storing of the received video streams is also referred to as recording the received video streams. The recording server may receive and store additional data associated with received video streams such as the previously discussed metadata stream.

The VMS 300 may store the generated metadata in a suitable metadata repository 340, such as a suitable metadata database, which may be separate from, or integrated into, the media repository 350. To this end, the VMS 300 may include an index server 330. The index server 330 may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata. During searches through the stored video and metadata streams the metadata repository 340 may be accessed through the interface 360 and index server 330. The UI client 400 may query the index server 330 through the interface 360 and return matching search results. The UI client 400 may be configured to respond to receipt of the matching search results by determining the corresponding position data of the metadata stream in question. The UI client 400 may be configured to utilize the time stamps of the metadata stream in question to find the positions on the geo-map that correspond to the matching search results.

Figure 2:
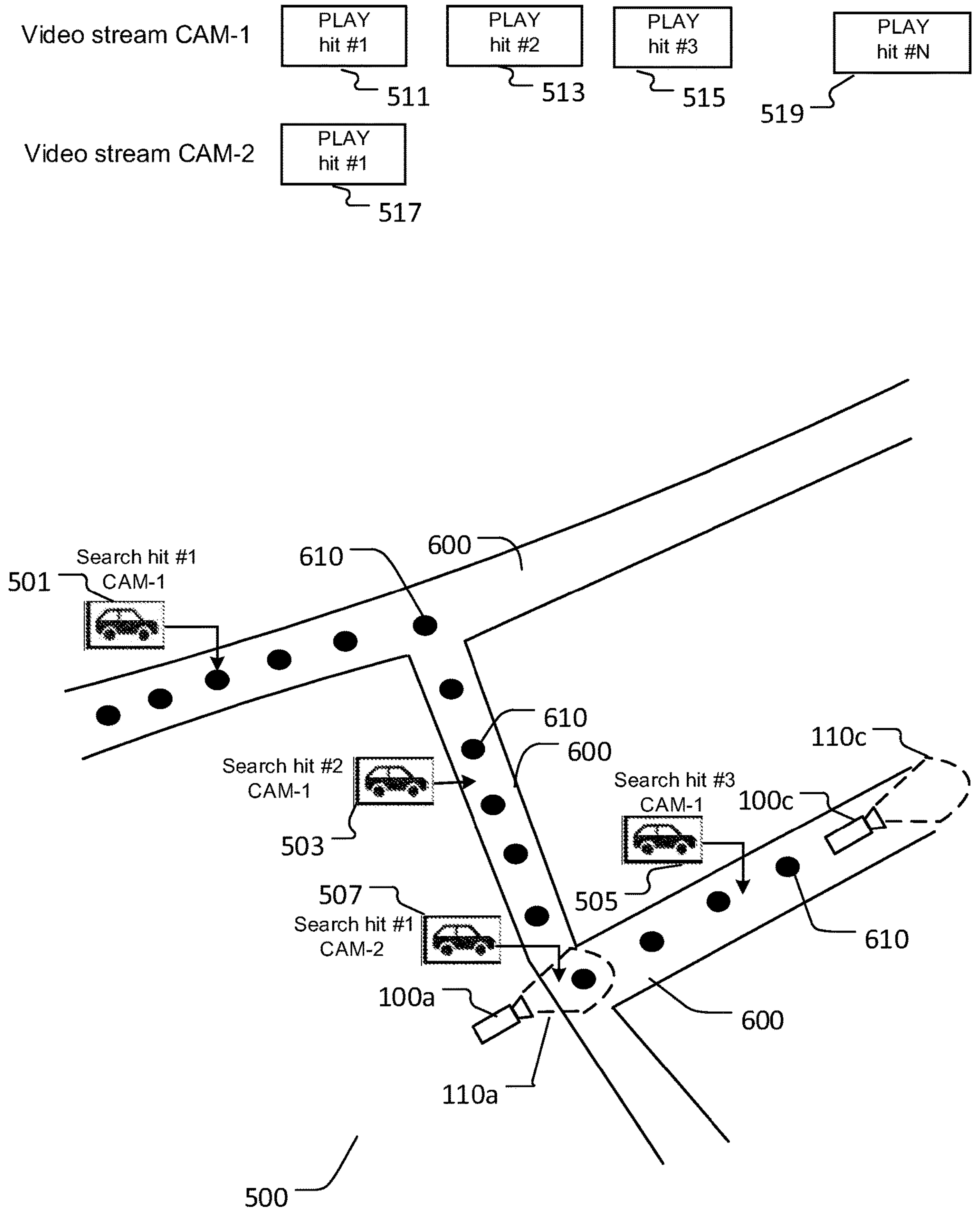
FIG. 2 illustrates in schematic form an exemplary graphical user interface 500 displayed on a UI client 400 of a first embodiment of the VMS 300 for the video surveillance system 10 of FIG. 1.

FIG. 2 illustrates in schematic form an exemplary graphical user interface 500, that may be displayed via a suitable screen or display of the UI client 400, of one embodiment of the VMS 300 of the video surveillance system 10 of FIG. 1. The graphical user interface 500 may be presented to an operator or user and display a geo-map of either a selected section of the surveillance area of the video surveillance system 10 or the entire surveillance area.

The video surveillance system 10 comprises a movable video camera 100*c* and a plurality of stationary video cameras 100*a*, 100*b*. The skilled person will understand that other embodiments of the video surveillance system 10 may comprise a plurality of movable video cameras and/or plurality of stationary video cameras. The movable video camera 100*c* may comprise a built-in GPS device (not shown) to detect or estimate a current position of the movable video camera 100*c*. Alternatively, the movable video camera 100*c* may have an associated GPS device, e.g. a GPS device fixed to a car or person carrying the movable video camera 100*c*, for detecting the current position. In either case, time stamps and corresponding position data supplied by the GPS device are added to, or embedded in, the respective metadata streams if not already included in the streams.

A user specified search query may be launched at the VMS 300 and comprise an identification of at least one of a target object, a target activity and a target incident in accordance with user defined search criteria. The search criteria may further define a selected portion of the surveillance area, a selected time period and a specification of one or more of the target object, target activity and target incident etc. The present exemplary search criteria define the target object as a “red sedan car” and may further specify a certain time span and a certain geographical area. The VMS 300 searches the respective video streams and associated metadata generated by the movable video camera(s) 100*c* and the stationary video cameras 100*a*, 100*b*. The video streams and their associated metadata may be received via a suitable data interface 310 of a processing unit of the VMS 300. The search through the video streams identifies the red sedan car at several street locations in the surveillance area at different time instances for example using well-known object detection algorithms. The search hits of the video streams supplied by the movable video camera 100*c* are illustrated as search hits or results #1-3 (CAM-1). A single search hit or result of the video stream supplied by the stationary video camera 100*a* is illustrated as search hit #1 (CAM-2). The search results are displayed on the screen via the user interface client (UI client) 400 by respective thumbnails 501, 503, 505, 507. The thumbnails 501, 503, 505, 507 are located at the respective positions of the red sedan car on the street or road 600 on a geo-map of the surveillance area. These positions of the red sedan car are indicated by corresponding arrows from the thumbnails 501, 503, 505, 507 pointing to the road positions. Each of the thumbnails 501, 503, 505, 507 preferably shows a frame of the corresponding video stream of a particular search result.

The VMS 300 may optionally be configured to determine a camera trail 610 associated with detected positions of the movable video camera 100*c* and display or present the camera trail 610 by a plurality of position markers on the streets of the geo-map.

The processing unit may further be configured to associate the search results and corresponding thumbnails of the plurality of video streams with respective video sequences or clips. The video sequences may include a plurality of frames before and after the time of the frame of the thumbnail. The user interface is configured to display a plurality of user clickable or actuatable buttons 511, 513, 515, 517, 519 via the graphical user interface 500 corresponding to the respective video sequences. The user is thereby able to open the video sequences to which the thumbnails correspond in an intuitive manner.

The skilled person will appreciate that the direct display on the geo-map of the positions of video cameras along the route together with the thumbnails provide the user with a fast and intuitive overview of the area where the search object was found. This display scheme improves the user's awareness and decision making as to which particular area of the surveillance area should be investigated in relation to the search results. Another advantage is that the thumbnail presentation reduces cognitive loading of the user because it allows the user to focus on the most relevant search results based either on the objects or incidents seen in the thumbnails. As an example, there may be more than one red sedan car in the search results, but only one of these is the relevant or target car. The direct display of thumbnails on the geo-map allows the user to gain instant awareness of the route taken by the target car.

Figure 3:
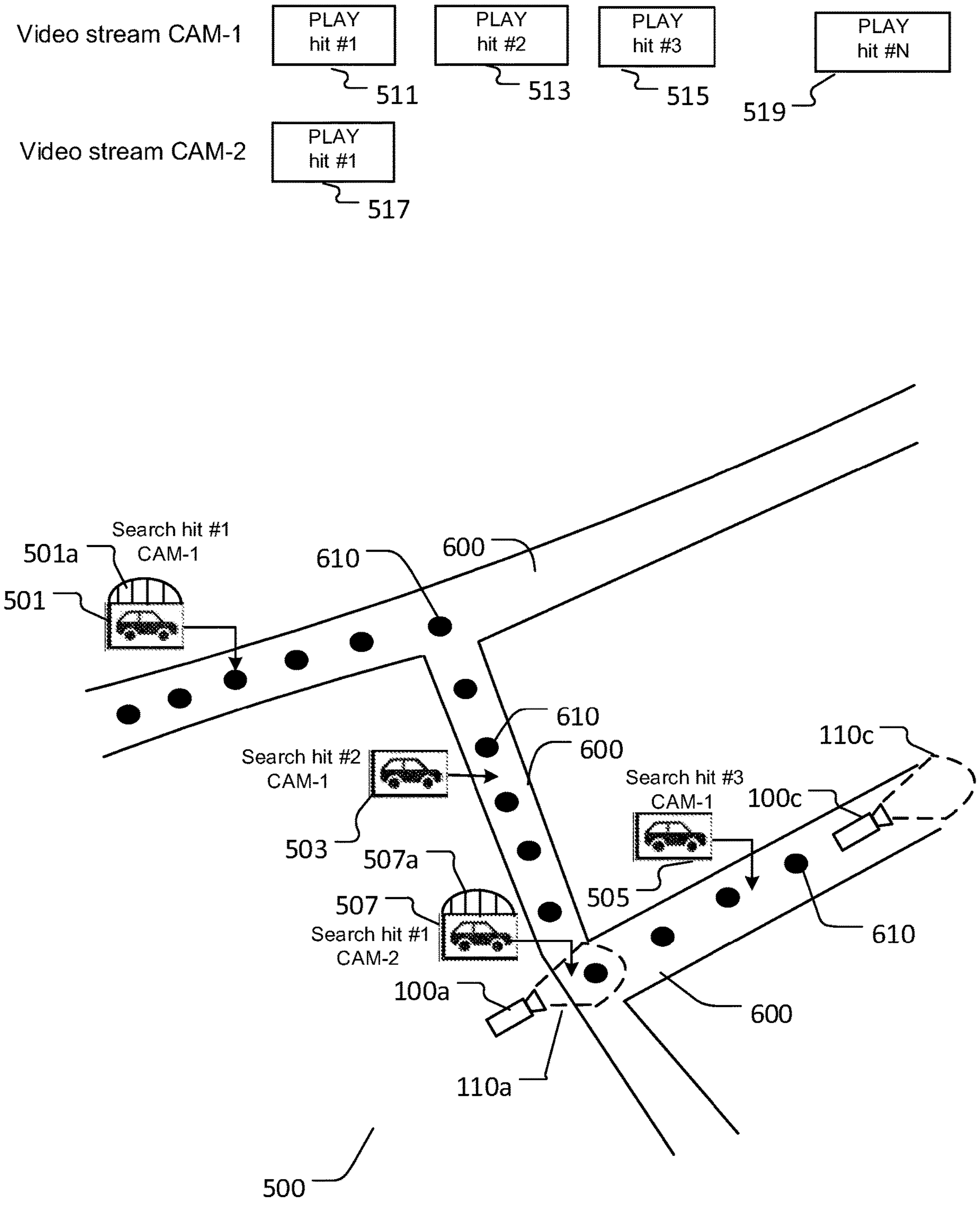
FIG. 3 illustrates in schematic form an exemplary graphical user interface 500 of a second embodiment of the VMS 300 of the video surveillance system 10 of FIG. 1.

FIG. 3 illustrates in schematic form an exemplary graphical user interface 500 of a second embodiment of the VMS 300 of the video surveillance system 10 of FIG. 1. The skilled person will appreciate that corresponding features to those of the first embodiment are given the same reference numerals and will not be described in connection with the present embodiment for brevity. The VMS 300 is configured to visually distinguish the previously discussed thumbnails 501, 503, 505, 507, which corresponds to the respective search results in the video and associated metadata streams, to the user via the graphical user interface 500. Each search result may correspond to a determined position and time instant of the target object which may be the previously discussed red sedan car. To make a user perceivable distinction between search results, the VMS 300 is configured to add a visual attribute to those thumbnails that represent the particular red sedan car that is the actual target. For example, the user inputs a search query that initially identifies a particular search object or objects like red sedan cars within the surveillance area of interest and/or within the time period of interest as discussed above. The VMS 300 in response may retrieve and search the relevant video streams and metadata stream and return initial search results that correspond to several different red sedan cars of which only one is the target one. The present embodiment of the VMS 300 is configured to refine the initial search results, either automatically or under user control, by analysing the initial search results for additional, and possibly unique, features of the target red sedan car such a particular license plate number. The VMS 300 now adds the visual attributes 501*a*, 507*a* to only those thumbnails of the displayed geo-map that represent the target red sedan car. The visual attributes 501*a*, 507*a* provide an intuitive visual distinction between target objects and none-target objects of a similar type. The skilled person will understand that numerous types of visual attributes may be associated with or added on the thumbnails for example icons, coloured borders, coloured objects, textual tags, etc.

According to a third embodiment of the VMS 300 the previously discussed thumbnails 501, 503, 505, 507, representing respective search results, may be clickable or selectable by the user via the graphical user interface 500 and possibly a mouse or similar. By clicking at, or on, a particular thumbnail the VMS 300 may be configured to further refine the initial search criteria and narrow down the search results to particular found object, e.g. the exemplary red sedan car in this case. In response, VMS 300 may be configured to display all hits of the selected object in the observed area or display all search results for specified surveillance area, but now without time limitations according to least one supplementary search criterion input by the user. This feature allows the user to track the target object and/or target incident etc. faster in a single search. The skilled person will understand that the VMS 300 may combine one or more features or elements of the third embodiment with one or more features or elements of the second embodiment and/or with one or more features of the first embodiment.

While the present disclosure has been described with reference to embodiments, it is to be understood that the present disclosure is not limited to the disclosed embodiments. The present disclosure can be implemented in various forms without departing from the principal features of the present disclosure as defined by the claims. Such variations may derive, in particular, from combining aspects of the present disclosure as set forth in the above disclosure and/or in the appended claims.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The word "comprising" does not necessarily exclude other elements or steps, and the indefinite article "a" or "an" does not necessarily exclude a plurality. A single processing unit or multiple processing units or other unit may fulfil the functions of several items recited in the claims. The mere fact that different features are recited in mutually different dependent claims does not indicate that a combination of these features cannot be advantageously used. Any reference signs in the claims should not be construed as limiting the scope of the disclosure.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processor or processing unit.

The invention claimed is:

1. A video management system comprising:

a graphical user interface configured to present a plurality of video streams and a geo-map of a surveillance area; and a processing unit configured to:

receive a plurality of video streams from a plurality of video cameras in the surveillance area via a data communication interface;

receive metadata streams via the data communication interface;

search the plurality of video streams and respective metadata streams in accordance with one or more search criteria to identify at least one of a target object, a target activity and a target incident in the surveillance area;

display all search results of the plurality of video streams by displaying respective thumbnails in the graphical user interface, wherein each thumbnail comprises a frame of a video stream corresponding to a search result, wherein each thumbnail is displayed on a geo-map at respective positions of each search result, wherein the position of each search result is based on a position of the video camera associated with the respective video stream corresponding to the search result;

apply at least one supplementary search criterion, automatically or under user control, to the search results of the plurality of video streams to identify a subset of search results matching the least one supplementary search criterion; and add visually distinguishing attributes to the respective thumbnails of the geo-map representing the subset of search results matching the least one supplementary search criterion, wherein each thumbnail of the subset of search results on the geo-map is visually distinguished from the remaining thumbnails of the search results on the geo-map, and wherein thumbnails corresponding to search results that do not match the at least one supplementary search criterion remains displayed on the geo-map without removal such that the thumbnails representing the subset of search results are visually distinguished in the context of all thumbnails correspond to the search results of the one or more search criteria.

2. The video management system according to claim 1, wherein the processing unit is further configured to:

determine at least one camera trail associated with detected positions of at least one movable video camera; and display the at least one camera trail by a plurality of position markers on the geo-map.

3. The video management system according to claim 1, wherein the processing unit is configured to:

utilize search criteria defined by a VMS operator for the search of the plurality of video streams and associated metadata streams.

4. The video management system according to claim 1, wherein the processing unit is configured to:

store the plurality of video streams and respective metadata streams in a video data repository and in a metadata repository, respectively; and retrieve the plurality of video streams and respective metadata streams from the video data repository and metadata repository, respectively.

5. The video management system according to claim 1, wherein the processing unit is configured to:

associate the respective thumbnails of the search results with corresponding video sequences of the plurality of video streams; and display a plurality of user clickable or activatable buttons corresponding to the video sequences via the graphical user interface.

6. The video management system according claim 1, wherein the processing unit is configured to:

determine an operator selection of one or more of the thumbnails; and determine the at least one supplementary search criterion based on the selection of one or more of the thumbnails.

7. The video management system according to claim 1, wherein the visually distinguishing attributes comprise at least one of a color, such as coloured borders, coloured objects, textual tags and icons.

8. A video surveillance system comprising a plurality of video cameras arranged in a surveillance area and configured to generate respective video streams and a video management system according to claim 1.

9. The video surveillance system according to claim 8, wherein the plurality of video cameras are associated with respective position detecting devices, and metadata streams associated with the video streams are supplied.

10. The video surveillance system according to claim 8, wherein the plurality of video cameras comprise at least one moveable video camera, wherein the or each movable video camera is geographically dynamic.

11. The video surveillance system according to claim 8, wherein the plurality of video cameras comprise at least one stationary video camera.

12. A computer-implemented video management method for a video management system, comprising steps:

a) receive, at the video management system, a plurality of video streams and respective metadata streams supplied by, or associated with, respective ones of a plurality of video cameras;

b) retrieve a geo-map of a surveillance area of the video surveillance system;

c) search the plurality of video streams and respective metadata streams in accordance with one or more search criteria;

d) identify at least one of a target object, a target activity and a target incident in the surveillance area in response to the search;

e) display all search results of the plurality of video streams by displaying respective thumbnails via a graphical user interface, wherein each thumbnail comprises a frame of a video stream corresponding to a search result;

f) indicate positions of all the search results by the respective thumbnails on the geo-map, wherein the position of each thumbnail is displayed on the geo-map at respective positions of each search result, wherein the position of each search result is based on a position of the video camera associated with the respective video stream corresponding to the search result;

g) apply at least one supplementary search criterion, automatically or under user control, to the search results of the plurality of video streams to identify a subset of search results matching the least one supplementary search criterion; and h) add visually distinguishing attributes to the respective thumbnails of the geo-map representing the subset of search results matching the least one supplementary search criterion wherein each thumbnail of the subset of search results on the geo-map is visually distinguished from the remaining thumbnails of the search results on the geo-map, and wherein thumbnails corresponding to search results that do not match the at least one supplementary search criterion remain displayed on the geo-map without removal, such that the thumbnails representing the subset of search results are visually distinguished in the context of all thumbnails corresponding to the search results of the one or more search criteria.

13. The computer-implemented video management method for a video surveillance system according to claim 12, further comprising:

i) determine at least one camera trail associated with detected positions of at least one movable video camera; and j) display the at least one camera trail by a plurality of position markers on the geo-map.

14. The computer-implemented video management method for a video surveillance system according to claim 12, further comprising:

k) store the plurality of video streams and respective metadata streams in a video data repository and in a metadata repository, respectively;

l) retrieve the plurality of video streams and respective metadata streams from the video data repository and metadata repository, respectively, apply step c) of searching the plurality of video streams and respective metadata streams in accordance with one or more search criteria.

15. The computer-implemented video management method for a video surveillance system according to claim 12, further comprising:

m) associate the search results of the plurality of video streams and respective metadata streams with respective video sequences;

n) associate the respective thumbnails of the search results by corresponding video sequences of the plurality of video streams; and o) display a plurality of user clickable or activatable buttons corresponding to the video sequences via the graphical user interface.

16. A video management system comprising:

a user screen or display comprising a graphical user interface configured to present the plurality of video streams and a geo-map of a surveillance area; and a processing unit configured to:

a) receive a plurality of video streams from a plurality of video cameras in the surveillance area via a data communication interface;

b) receive metadata streams via the data interface, the metadata streams being from position detecting devices associated with the plurality of video cameras via a data;

c) search the plurality of video streams and respective metadata streams in accordance with one or more search criteria to identify at least one of a target object, a target activity and a target incident in the surveillance area;

d) display all search results of the plurality of video streams by displaying respective thumbnails on the user screen or display via the graphical user interface, wherein each thumbnail comprises a frame of a video stream corresponding to a search result, the position of each search result is based on a position of the video camera associated with the respective video stream corresponding to the search result, wherein each thumbnail is displayed on a geo-map at respective positions of the search results;

e) determine a selection of one or more of the search results through a user interaction;

f) determine at least one supplementary search criterion based on the one or more selected search results;

g) search the plurality of video streams and respective metadata streams in accordance with the at least one determined supplementary search criterion; and h) update the user screen or display based on the search results from step g) by adding a visually distinguishing attribute to the thumbnails of the geo-map representing the search results from step g) matching the least one determined supplementary search criterion, wherein each thumbnail of the search results from step g) on the geo-map is visually distinguished from each of the remaining thumbnails from search performed in step c) on the geo-map, and wherein thumbnails corresponding to search results from search performed in step c) that do not match the at least one determined supplementary search criterion remain displayed on the geo-map without removal, such that the thumbnails representing the search results from step g) are visually distinguished in the context of all thumbnails corresponding to the search results from search performed in step c).

* * * * *